United States Patent
Becker et al.

(10) Patent No.: US 7,426,545 B2
(45) Date of Patent: Sep. 16, 2008

(54) SYSTEMS AND METHODS FOR TRANSPARENTLY ACCESSING WEB APPLICATIONS REMOTELY AND LOCALLY

(75) Inventors: Craig Henry Becker, Austin, TX (US); Stewart Earle Nickolas, Austin, TX (US); Wayne Elmo Vicknair, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1170 days.

(21) Appl. No.: 10/184,330

(22) Filed: Jun. 28, 2002

(65) Prior Publication Data

US 2004/0003054 A1   Jan. 1, 2004

(51) Int. Cl.
    G06F 15/16   (2006.01)
(52) U.S. Cl. ................ 709/219; 709/217; 709/203
(58) Field of Classification Search ........... 709/219, 709/203, 217
    See application file for complete search history.

(56) References Cited

U.S. PATENT DOCUMENTS

| | | | | |
|---|---|---|---|---|
| 5,956,036 | A * | 9/1999 | Glaser et al. ............. 715/853 |
| 6,052,710 | A | 4/2000 | Saliba et al. |
| 6,144,991 | A * | 11/2000 | England ................ 709/205 |
| 6,199,195 | B1 | 3/2001 | Goodwin et al. |
| 6,573,907 | B1 * | 6/2003 | Madrane ................ 715/719 |
| 6,604,150 | B1 | 8/2003 | Gebhart et al. |
| 6,640,255 | B1 | 10/2003 | Snyder et al. |
| 6,675,193 | B1 * | 1/2004 | Slavin et al. ............ 709/200 |
| 6,734,873 | B1 * | 5/2004 | Herf et al. .............. 345/629 |
| 6,753,886 | B1 | 6/2004 | Schuft |
| 6,757,731 | B1 * | 6/2004 | Barnes et al. ........... 709/227 |
| 6,799,301 | B1 * | 9/2004 | Francis et al. .......... 715/523 |
| 6,802,061 | B1 * | 10/2004 | Parthasarathy et al. .... 717/173 |
| 6,826,696 | B1 * | 11/2004 | Chawla et al. ........... 713/201 |
| 6,842,781 | B1 * | 1/2005 | Lavian et al. ........... 709/223 |
| 6,845,507 | B2 | 1/2005 | Kenton |
| 6,889,363 | B2 * | 5/2005 | Maloney ................ 715/765 |
| 6,889,379 | B1 * | 5/2005 | Lindhorst et al. ........ 719/316 |
| 6,904,600 | B1 * | 6/2005 | James et al. ............ 719/328 |
| 6,915,454 | B1 * | 7/2005 | Moore et al. ............ 714/38 |
| 6,961,929 | B1 | 11/2005 | Pelegri-Llopart et al. |
| 6,983,421 | B1 * | 1/2006 | Lahti et al. ............. 715/763 |

(Continued)

OTHER PUBLICATIONS

Antonio Garcia, "The Visitor Design Pattern," available via the Internet at http://exciton.cs.oberlin.edu/javaresources/DesignPatterns/VisitorPattern.html, pp. 1-2, printed Jun. 19, 2002.

(Continued)

*Primary Examiner*—Bunjob Jaroenchonwanit
*Assistant Examiner*—Lan-Dai T Truong
(74) *Attorney, Agent, or Firm*—Duke W. Yee; Jeffrey S. LaBaw; Peter B. Manzo

(57) ABSTRACT

A method, computer program product and system for accessing a Web application. The Web application may be accessed by receiving a request for the Web application where the request includes an identifier of the Web application. In response to the identifier of the Web application, one of a local and a remote target of the Web application may be determined. The request may be dispatched to a target in response to input data identifying the Web application and, alternatively, form selection input.

5 Claims, 6 Drawing Sheets

U.S. PATENT DOCUMENTS

| | | | |
|---|---|---|---|
| 6,986,147 B2* | 1/2006 | Gooding | 719/330 |
| 7,127,700 B2 | 10/2006 | Large | |
| 2001/0037490 A1 | 11/2001 | Chiang | |
| 2001/0047402 A1 | 11/2001 | Saimi et al. | |
| 2002/0054137 A1 | 5/2002 | Dvorak | |
| 2002/0124055 A1* | 9/2002 | Reisman | 709/218 |
| 2002/0184145 A1 | 12/2002 | Sijacic et al. | |
| 2003/0110416 A1* | 6/2003 | Morrison et al. | 714/39 |
| 2003/0226107 A1 | 12/2003 | Pelegri-Llopart et al. | |
| 2004/0049574 A1 | 3/2004 | Watson et al. | |

OTHER PUBLICATIONS

John Clements, "Lecture 12: The Visitor Pattern," Oct. 13, 1998, available via the Internet at http://www.cs.rice.edu/-clements/312/10-13, pp. 1-4.

Ivan Marsic, Chapter 2 "Design Patterns and Software Components," *Software Engineering of Web Applications*, available via the Internet at http://wwws.caip.rutgers.edu/-marsic/Teaching/SEW/title.html, 20 pp.

Erich Gamma et al., "Design Patterns—Elements of Reusable Object-Oriented Software," pp. 331-344.

"JavaScript Language Specification", JavaScript 1.1, Oct. 3, 1996, pp. 1-107.

Aranha et al., "Web Service Acceptance Tests and Code Generation", Proceedings of Workshop on Testing in XP WtiXP 2002, May 2002, Italy, pp. 1-59. http://www.cwi.nl/wtixp2002/.

Aranha A. and Borba P. : "Web Service Acceptance Tests and Code Generation", Internet Article, Proceedings os Workshop On testing in XP, WTIXP 2002(May 27, 2005) (http://www.cwi.nl/events/2002/wtixp/papers/wtixp2002-proceedings.pdf).

Brown, "Encapsulate reusable functionality in JSP tags", JavaWorld, Aug. 2000, pp. 1-7. http://www.javaworld.com/javaworld/jw-08-2000-jw-0811-jstags_.p.html, retrieved Dec. 15, 2005.

Lerner, "At the Forge: Custom JSP Actions", Linux Journal, Jul. 2001, pp. 1-7.

Jakarta Project: I0 Tag library: Tags for working with FTP, HYYP, HTTPS, XML-RPC and SOAP, Version 1.0, Mar. 2000, pp. 1-13. http://jakarta.apache.org/taglibs/doc/io-doc/.

* cited by examiner

SYSTEMS AND METHODS FOR TRANSPARENTLY ACCESSING WEB APPLICATIONS REMOTELY AND LOCALLY

CROSS-REFERENCE TO RELATED APPLICATIONS

Related subject matter may be found in the following commonly assigned, co-pending U.S. patent applications, which are hereby incorporated by reference herein:

Ser. No. 10/185,779, entitled "SYSTEMS AND METHODS FOR MESSAGING IN A MULTI-FRAME WEB APPLICATION";

Ser. No. 10/185,796, entitled "SYSTEMS AND METHODS FOR ACCESSING WEB SERVICES USING A TAG LIBRARY"; and Ser. No. 10/184,255, entitled "SYSTEMS AND METHODS FOR DISPLAYING AND EXECUTING WEB SERVICES IN MULTIPLE CONTENT DOMAINS".

TECHNICAL FIELD

The present invention is related in general to data processing systems, and in particular, to data processing systems for distributed data processing via a network in which web service applications may be deployed and transparently accessed in a client-server mode and a client-only mode.

BACKGROUND INFORMATION

The advent of networked data processing systems, and, particularly, the network of networks referred to as the Internet, has spurred the introduction of distributed data processing services. In such systems, a client, typically remotely connected to the service provider via one or more networks, accesses a software application implemented on the remote data processing system which returns the results of the data processing activity to the client. It has become common to use the services represented by the World Wide Web (WWW) with its graphical user interface (GUI) orientation to provide the interface to such applications, which may be referred to a Web application Typically, in such distributed processing systems, the client sends a request to the server. The request may include one or more parameters which may be inputs to the particular service requested. On the server side, the system builds a Web page for returning the response to the requesting client. The server accesses a server page containing code that defines the Web page. Embedded in the code for generating the page, i.e. HTML script, is code that is executable by the server to generate the necessary HTML script to display the results on the client machine.

A Web browser running on the client machine is an application that can interpret the HTML and display the page on a conventional display such as a CRT monitor connected to the client machine. Commercially available Web browsers include Netscape Navigator®, Mozilla, Internet Explorer®, iCab, and Opera. Technologies for implementing distributed computing services in this way include Active Server Pages (ASP) and Java™ Server Pages (JSP). Additionally, such services may access server-side application software to perform some or all of the requested tasks via an environment-independent interprocess communication application program interface (API) such as DCOM (Distributed Component Object Model), CORBA (Common Object Request Broker Architecture) or Remote Method Invocation (RMI). In response to execution of the page by the browser, the application software generates dynamic data and returns the data to the client which then displays the data in accordance with the code defining the page.

However, it is not always convenient or efficient to run a Web application in a client-server mode. For example, during development of the application itself, it may be advantageous to deploy the application on the developer's machine for testing while still exploiting the net-centric interface discussed hereinabove. Additionally, in the user environment, it may be useful to deploy a particular Web service application on the user's machine, which may then be run locally using the same net-centric interface, so that, from the user's perspective, the functioning of the application is transparent whether run locally or remotely via a network. For example, a Web service application that handles employee travel reporting may also advantageously be deployed on an employee's machine, such as a laptop computer, so the employee may complete the report while travelling without the need for a network connection to access the application.

Thus, there is a need in the art for a mechanism to access a Web service application both remotely and locally, whereby a user may transparently run a Web service application in a client-server mode and a client-only mode.

SUMMARY OF THE INVENTION

The problems outlined above may at least in part be solved in some embodiments by accessing a Web service application both remotely and locally, whereby a user may transparently run a Web service application in a client-server mode and a client-only mode. In one embodiment of the present invention, a method for accessing a Web application may include the step of receiving a request for the Web application. The method may further include dispatching the request to one of a locally deployed and remotely deployed instance of the Web application. The dispatching of the request may be mediated by a method in a first page of the Web application, in which the request is selectively dispatched in response to first input data. If the request includes second input data for the Web application, the step of dispatching the request may also include reducing the request to a set of parameters in response to the second input data, and passing the set of parameters to the Web application.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
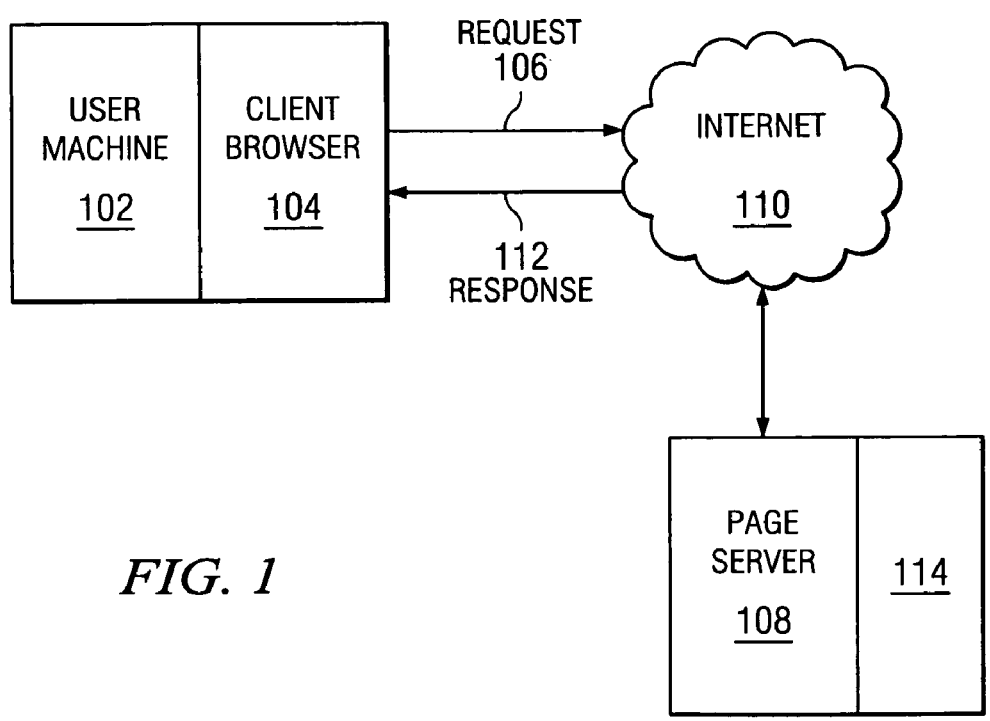
FIG. 1 illustrates a network architecture for providing Web services which may be used in conjunction with the present invention.

In the following description, numerous specific details are set forth to provide a thorough understanding of the present invention. For example, exemplary code for accessing particular Web applications may be described, however it would be recognized by those of ordinary skill in the art that the present invention may be practiced without such specific details, and in other instances, well-known circuits have been shown in block diagram form in order not to obscure the present invention in unnecessary detail. Refer now to the drawings wherein depicted elements are not necessarily shown to scale and wherein like or similar elements are designated by the same reference numeral through the several views.

Referring to FIG. 1, there is illustrated a distributed data processing system architecture 100 which may be used for accessing Web applications in accordance with the present inventive principles. A Web application may be accessed when a request for a web document, or page, is received from a user machine, such as user machine 102, running a client web browser 104. Client browser 104 initiates a request 106, which is transmitted to the targeted web server, illustrated by page server 108, in FIG. 1, via a network, shown in FIG. 1 as Internet 110.

Page server 108 responds to the request by returning the requested page in response 112. The requested page may include data that is to be generated dynamically. Such dynamic data may be displayed locally on the user machine in response to client browser 104 executing the script defining the page returned in response 112. Dynamic data may be generated by web application 114 and the result incorporated in the page returned in response 112 to client browser 104, which displays the data in accordance with the code defining the page, which may be, for example, an HTML (Hypertext Markup Language) script.

Figure 3:
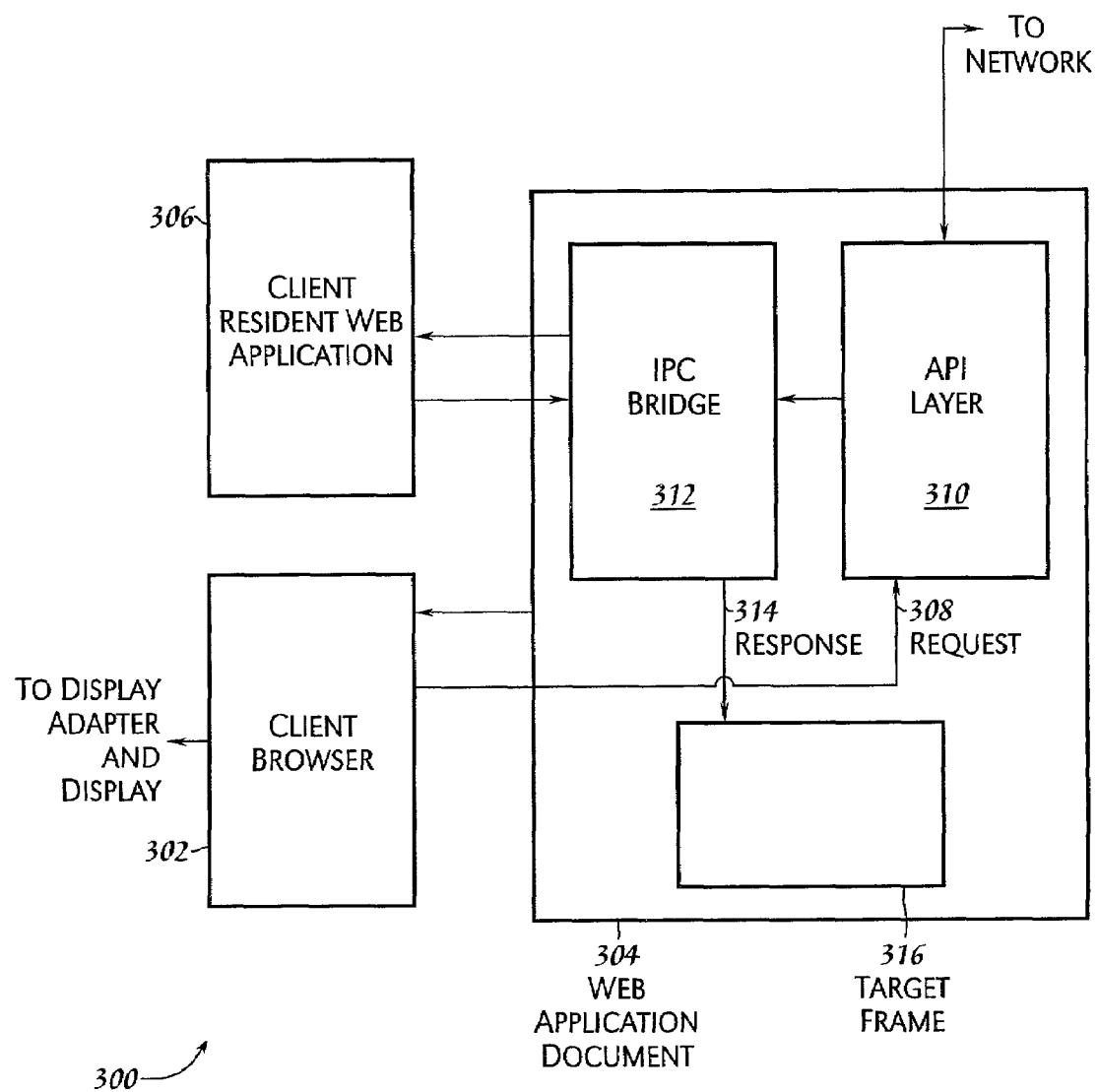
FIG. 3 illustrates a software architecture for transparently accessing web service applications in accordance with the principles of the pressure invention.

Additionally, as described further in conjunction with FIG. 3, a Web application may be deployed locally (not shown in FIG. 1). A mechanism for transparently accessing such a client-resident web application will be discussed hereinbelow.

Figure 2:
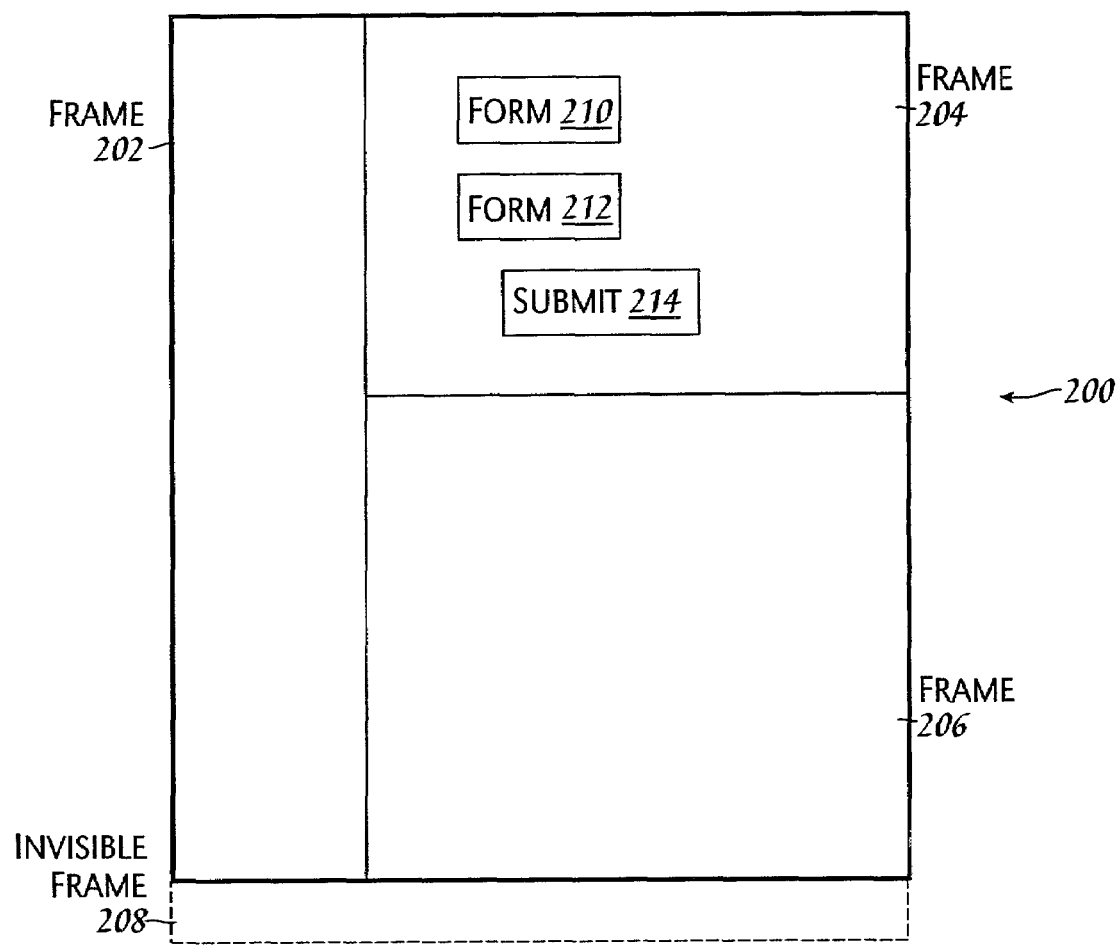
FIG. 2 illustrates a multiframe document window in accordance with the present inventive principles.

FIG. 2 illustrates an exemplary multi-frame document window as may be presented in a GUI. Shown are three exemplary frames, frame 202, 204 and 206. Additionally, document 200 may include invisible frame 208. Invisible frame 208 may be zero pixels tall. The use of invisible frame 208, which is not displayed to the user, will be described further hereinbelow. Additionally, two forms, form 210 and form 212 are depicted in frame 204. Forms, as would be appreciated by those of ordinary skill in the art, may be used to provide user input data, and in the context of a Web application, this data may be used to supply input parameters to the Web service. A request to the Web service may be initiated by submitting the form by activating a "button" in the page, such as submit 214. Frame 206 may receive responses to requests. It would be recognized that the initiation of requests and the frame targeted to receive the responses are exemplary and other mechanisms and window layouts would fall within the spirit and scope of the present inventive principles.

Referring now to FIG. 3, there is illustrated a software architecture 300 for transparently accessing web service applications in accordance with the principles of the present invention. Client browser 302 provides the user interface to web documents in the usual way. In the context of a Web application, client browser 302 displays Web application document 304, which, as illustrated in FIG. 3, shows architectural features of the Web application document in accordance with the present inventive principles. Additionally, architecture 300 includes the client resident Web application software 306 which effects the local access to requested Web application.

In response to user input, client browser 302 may initiate a request for a web service corresponding to the client resident Web application. This is passed in request 308 to API (Application Program Interface) layer 310 in Web application document 304. API layer 310 may, in an exemplary embodiment of the present invention be a JavaScript interface which exposes a JavaScript dispatch function that can be invoked from within the Web application document, such as Web application document 304. Arguments to the dispatch function may include the name of the target window, and a message containing a set of parameters specifying the operations to be performed by the web service application. An exemplary HTML for invoking the function may read:

<a href="javascript:top.dispatch('target_frame', 'targ_cmd','sub_cmd');">invoke<\a>.

As would be recognized by those of ordinary skill in the art, the foregoing HTML statement represents a hypertext reference to a JavaScript function method defined in the top level document of the Web application. The name of the target window is 'target_frame', the name of the command to be executed is 'targ_cmd', and the name of the subfunction within targ_cmd is 'sub_cmd'. In this embodiment of the present invention, the command to be executed may be viewed as a container for the subfunction. It would be appreciated by those of ordinary skill that, more generally, in an alternative embodiment, the dispatch function may have the structure:

dispatch('target_frame','target_command','zero or more additional parameters'.)

The parameters may depend on the particular operation being performed by the Web application.

The dispatch function may then reduce the input data to a set of parameters and pass the parameters to a command object, the methods of which may include a standard set of methods to cause the selected command to set input variables, execute, and read output values. An exemplary command object may have the form:

aCommand.setX(param_X);
aCommand.setY(param_Y);
aCommand.execute();
result=aCommand.getResult();

The request is forwarded, via API layer 310 to either the network, wherein the request is serviced by the Web application (such as Web application 114, FIG. 1), or, alternatively, to the client resident Web application 306 via IPC (interprocess communication) bridge 312. API layer 310 may forward the application request to either the remote Web application server, or, alternatively, to the client-resident Web application in response to the URI (Uniform Resource Identifier) of the Web application document. If the URI corresponds to the location of the Web application server, for example Web application 114, FIG. 1, then API layer 310 forwards the request to the network-connected Web application server. Such determination may be made when the URI scheme corresponds to "http:". Conversely, if the URI of the page corresponds to a local file, API layer 310 forwards the request to IPC bridge 312. Such determination may be made when the URI scheme corresponds to "file:". Note that other mechanisms may be used by the API layer to determine where to forward the application request. For example, a form button within the application may be displayed to allow the user to select the target (client or remote). It would be appreciated that such alternative embodiments would fall within the spirit and scope of the present invention.

IPC bridge 312 intermediates between the API layer, and the web service application software, which may be an executable binary file compiled from a high level programming language, such as Java™. In alternative embodiments of the present invention IPC bridge 312 may be implemented using interprocess communication technologies such as DCOM, RMI, CORBA or ActiveX. Note that ActiveX may be the preferred browser extension mechanism for use with Internet Explorer™, however, it would be appreciated by one of ordinary skill in the art that these alternative embodiments would fall within the principles of the present invention.

IPC bridge 312 maybe loaded in invisible frame 208, FIG. 2. For example, in an embodiment of the present invention using ActiveX as the IPC technology, the ActiveX Bridge may be obtained using standard signed ActiveX delivery mechanisms (that is, delivered over the net via HTTP) and loaded into an "invisible" container frame that exists within the Web Application for the purpose of containing the ActiveX Bridge. The ActiveX Bridge component consists of a command dispatcher which will invoke application commands locally. The ActiveX Bridge then "bridges" (that is, communicates) to the local application code. In an embodiment of the present invention in which the Web application is a Java application, the ActiveX communicates with the Web application by using the standard JNI (Java Native Interface) mechanism, converting arguments and return values appropriately between the web browser runtime environment and the application runtime environment. In such an embodiment, exceptional conditions are also handled through this ActiveX/JNI conduit.

Additionally, IPC bridge 312 forwards responses, received from the Web applications server, or, alternatively, the client resident Web application as appropriate, to the target passed in the argument of the dispatch function, that is, in the example discussed hereinabove, 'target_frame'. Thus, in FIG. 3, response 314 is forwarded to target frame 316. Client browser 302 then executes the HTML constituting the response when it renders target frame 316 on a display (not shown in FIG. 3).

The flowcharts provided herein are not necessarily indicative of the serialization of operations being performed in an embodiment of the present invention. Steps disclosed within these flowcharts may be performed in parallel. The flowcharts are indicative of those considerations that may be performed to produce transparent access to a Web service application. It is further noted that the order presented is illustrative and does not necessarily imply that the steps must be performed in order shown.

Figure 4:
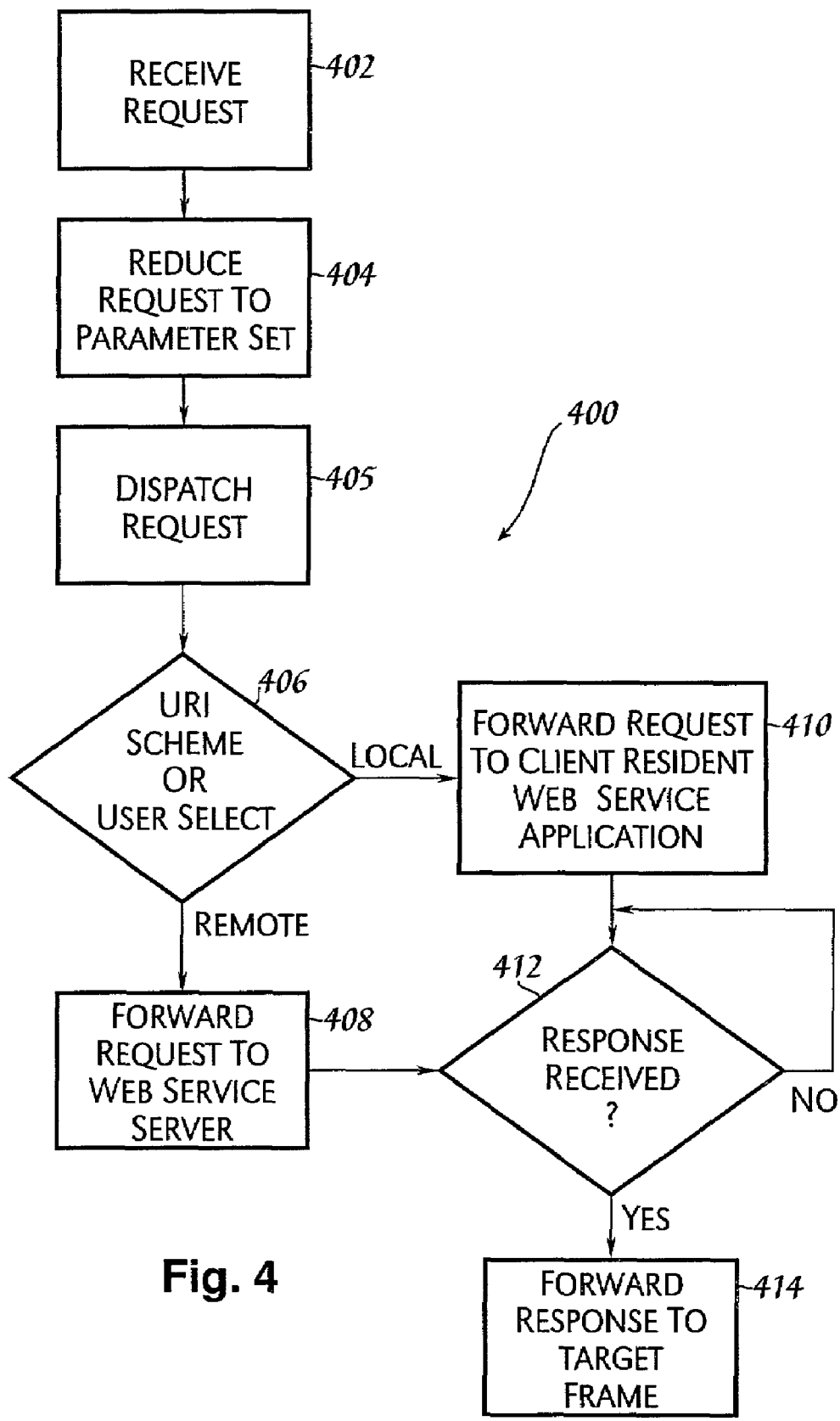
FIG. 4 illustrates, in flow chart form, a methodology for transparently accessing a Web application in accordance with an embodiment of the present invention.

Refer now to FIG. 4 illustrating, in flowchart form methodology 400 for effecting transparent access to a Web service application in accordance with an embodiment of the present invention. In step 402, a request is received from a Web page associated with the Web services application. For example, as discussed in conjunction with FIG. 2, a user may enter data into a form in a Web page in which the form data constitutes input data for a Web service application. In step 405, the request is reduced to a parameter set. Step 404 may be performed by API layer 310 in an embodiment of the present invention in accordance with the architecture 300 in FIG. 3. The request is dispatched in step 405. API layer 310 may perform this step.

The request is dispatched to the Web service application in accordance with a URI of the Web application document. If, the Web page address denotes a URI scheme of a network-connected server, or alternatively the user selects the remote application, step 406, the request is forwarded, to the corresponding Web service server, in step 408. Otherwise, if the URI corresponds to a local file, or the user selects the client-resident application, step 406 proceeds by the "local" branch, and in step 410 the request is forwarded to a client-resident Web service application, such as application 306, FIG. 3, via IPC bridge 312.

In step 412, upon receipt of the response to the request, the response is forwarded to the target frame, step 414. In an embodiment of the present invention in accordance with architecture 300, FIG. 3, IPC bridge 312 may perform step 414. Returning to step 412, pending receipt of the response, from the remote Web server, or alternatively, the client-resident Web service application depending on the target of the request in step 406.

Figure 5:
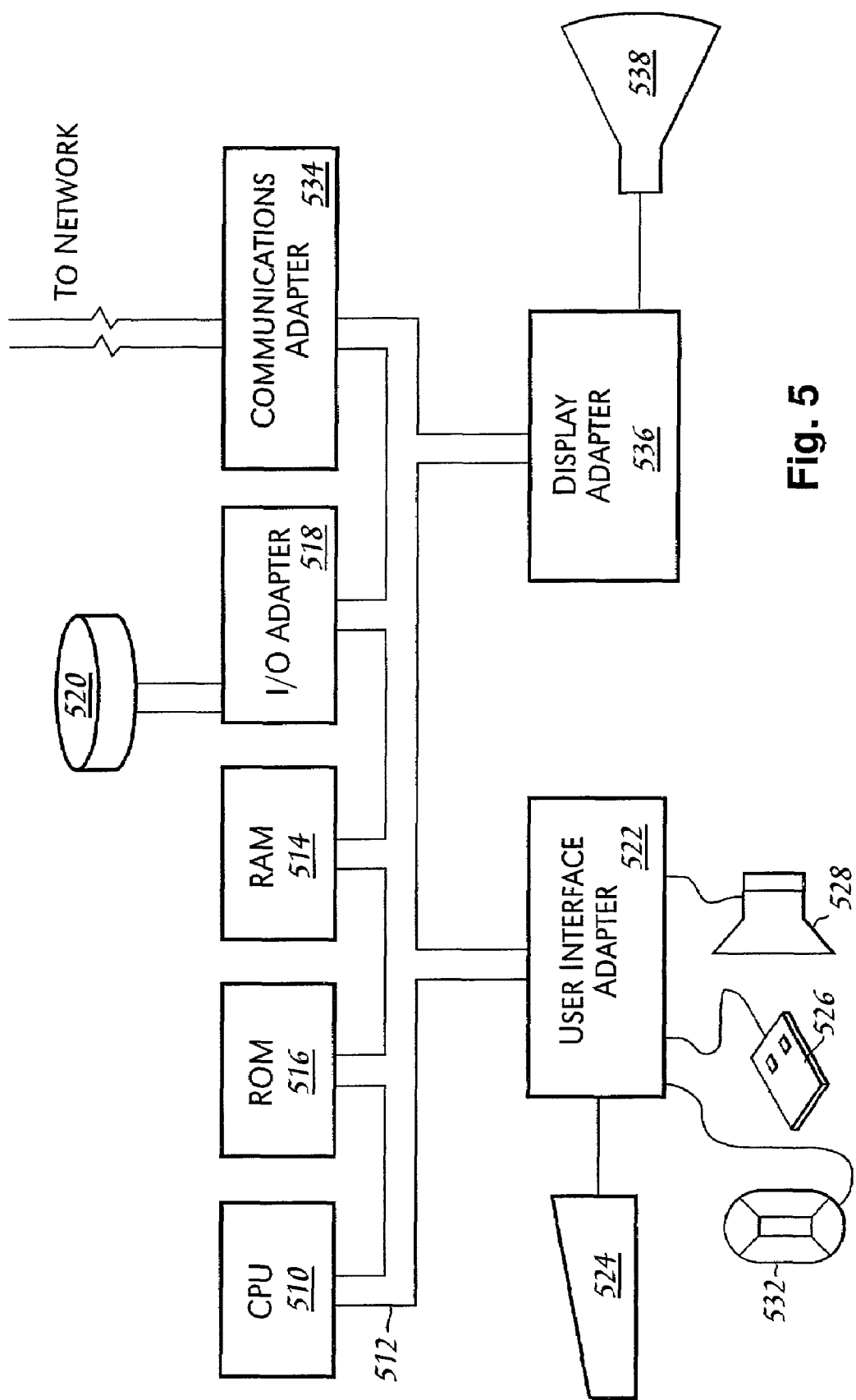
FIG. 5 illustrates, in block diagram form, a data processing system for accessing a Web application in accordance with an embodiment of the present invention.

A representative hardware environment for practicing the present invention is depicted in FIG. 5, which illustrates an exemplary hardware configuration of data processing system 500 in accordance with the subject invention. For example, developer client 204, FIG. 2 may be implemented in accordance with data processing system 500 having central processing unit (CPU) 510, such as a conventional microprocessor, and a number of other units interconnected via system bus 512. Data processing system 500 includes random access memory (RAM) 514, read only memory (ROM) 516, and input/output (I/O) adapter 518 for connecting peripheral devices such as disk units 520 to bus 512, user interface adapter 522 for connecting keyboard 524, mouse 526, and/or other user interface devices such as a touch screen device (not shown) to bus 512. System 500 also includes communication adapter 534 for connecting data processing system 500 to a data processing network enabling the data processing system to communicate with other systems, and display adapter 536 for connecting bus 512 to display device 538. CPU 510 may include other circuitry not shown herein, which will include circuitry commonly found within a microprocessor, e.g., execution unit, bus interface unit, arithmetic logic unit, etc. CPU 510 may also reside on a single integrated circuit.

Display monitor 538 is connected to system bus 512 by display adapter 536. In this manner, a user is capable of inputting to the system throughout the keyboard 554, trackball 535 or mouse 556 and receiving output from the system via speaker 558, display 538.

Preferred implementations of the invention include implementations as a computer system programmed to execute the method or methods described herein, and as a computer program product. According to the computer system implementation, sets of instructions for executing the method or methods are resident in the random access memory 514 of one or more computer systems configured generally as described above. These sets of instructions, in conjunction with system components that execute them may transparently access a Web service application remotely or, alternatively, locally. Until required by the computer system, the set of instructions may be stored as a computer program product in another computer memory, for example, in disk drive 520 (which may include a removable memory such as an optical disk or floppy disk for eventual use in the disk drive 520). Further, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 6:
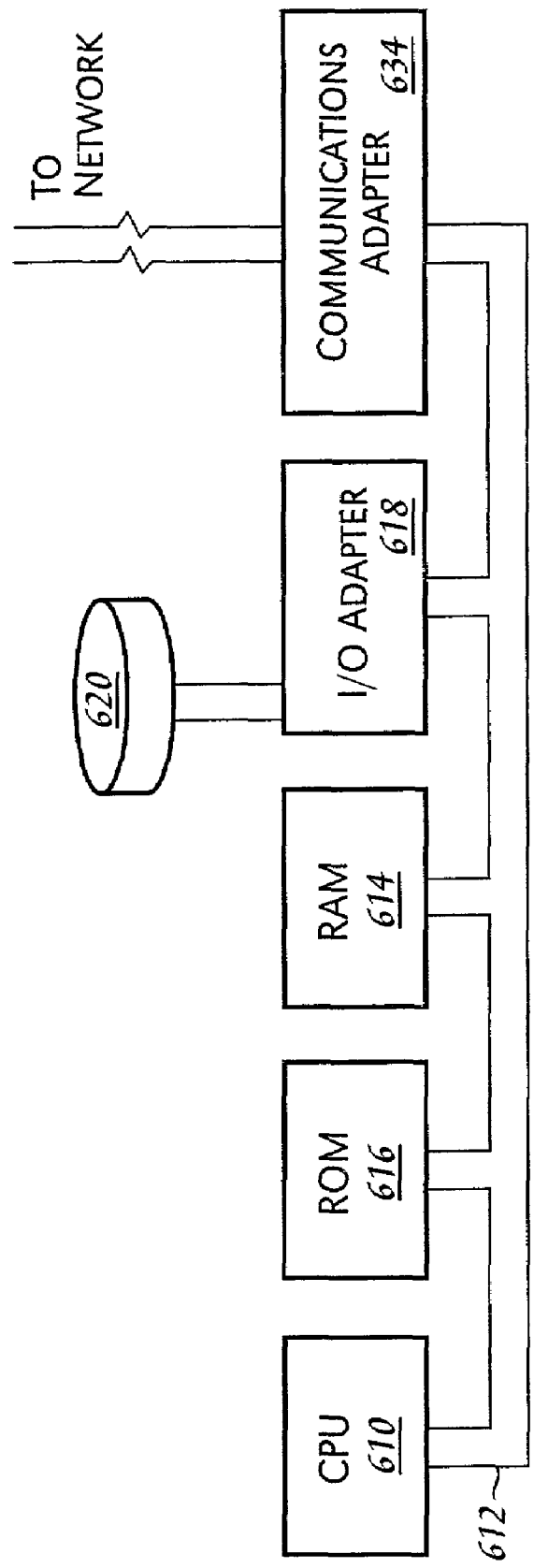
FIG. 6 illustrates, in block diagram form, a data processing system for accessing a remote web Application that may be used in conjunction with the system of FIG. 5.

Similarly, a data processing system 600 which may be used in conjunction with a Web service application server in accordance with the present inventive principles, is illustrated in FIG. 6. Similarly, a representative hardware environment for practicing the methodology of FIG. 5 in accordance with the present invention is depicted in FIG. 6. For example, page server 108 and Web application server 114, FIG. 1, may be implemented in accordance with data processing system 600. FIG. 6 illustrates an exemplary hardware configuration of data processing system 600 in accordance with the subject invention having central processing unit (CPU) 610, such as a conventional microprocessor, and a number of other units interconnected via system bus 612. Data processing system 600 includes random access memory (RAM) 614, read only memory (ROM) 616, and input/output (I/O) adapter 618 for connecting peripheral devices such as disk units 620 to bus 612. System 600 also includes communication adapter 634 for connecting data processing system 600 to a data processing network enabling the data processing system to communicate with other systems. CPU 610 may include other circuitry not shown herein, which will include circuitry commonly found within a microprocessor, e.g., execution unit, bus interface unit, arithmetic logic unit, etc. CPU 610 may also reside on a single integrated circuit.

Preferred implementations of the invention include implementations as a computer system programmed to execute the method or methods described herein, and as a computer program product. According to the computer system implementation, sets of instructions for executing the method or methods are resident in the random access memory 614 of one or more computer systems configured generally as described above. These sets of instructions in conjunction with the system components which execute them, may generate a Web application incorporating a dispatch function and IPC bridge in accordance with the present inventive principles. A methodology for generating such a Web application is described in the commonly-owned, concurrently filed U.S. patent application entitled "Systems And Methods for Defining Web Application Pages," which is hereby incorporated herein by reference. Until required by the computer system, the set of instructions may be stored as a computer program product in another computer memory, for example, in disk drive 620 (which may include a removable memory such as an optical disk or floppy disk for eventual use in the disk drive 620).

Further, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Although the present invention and its advantages have been described in detail, it should be understood that various changes, substitutions and alterations can be made herein without departing from the spirit and scope of the invention as defined by the appended claims.

What is claimed is:

1. A method for accessing a Web application comprising:
receiving a request for a Web application operation;
dispatching the request to one of a locally deployed instance of the Web application or a remotely deployed instance of the Web application, wherein the step of dispatching the request is mediated by a method in a first page of the Web application, and wherein the request is selectively dispatched in response to first input data; and
if, the request includes second input data for the Web application, the step of dispatching the request further comprises:
reducing the request to a set of parameters in response to the second input data; and
passing the set of parameters to the Web application, wherein an interprocess communication interface that intermediates between the method and the Web application and resides in an invisible frame of a page of the Web application selectively forwards responses received from the locally deployed instance of the Web application and the remotely deployed instance of the Web application to a target frame as specified by a parameter within the set of parameters included with the request.

2. The method of claim 1 wherein, if the request is dispatched to the locally deployed instance of the Web application, the method further comprises passing the request to the locally deployed instance of the Web application via the interprocess communication interface.

3. The method of claim 2 wherein the interprocess communication interface comprises an ActiveX control.

4. The method of claim 1 further comprising:
executing the Web application operation;
generating a second page in response to the step of executing the Web application operation, wherein the second page includes a result of the Web application operation; and
returning the page to a client.

5. The method of claim 1 wherein the first input data is selected from the group consisting of a URI scheme and a form selector operable for selecting between two target instances of the Web application, the two target instances being the locally deployed and remotely deployed instance of the Web application.

* * * * *